(12) United States Patent
Mares

(10) Patent No.: US 8,798,868 B2
(45) Date of Patent: Aug. 5, 2014

(54) ACTIVE AERODYNAMIC CHASSIS CONTROL

(75) Inventor: Mark E. Mares, Peoria, AZ (US)

(73) Assignee: Toyota Motor Engineering & Manufacturing North America, Erlanger, KY (US)

( * ) Notice: Subject to any disclaimer, the term of this patent is extended or adjusted under 35 U.S.C. 154(b) by 0 days.

(21) Appl. No.: 13/250,866

(22) Filed: Sep. 30, 2011

(65) Prior Publication Data

US 2013/0085641 A1    Apr. 4, 2013

(51) Int. Cl.
*B60G 17/0195*    (2006.01)

(52) U.S. Cl.
USPC ........... 701/48; 701/36; 701/45; 701/46; 701/70; 296/180.5; 296/180.1; 180/210; 104/282; 104/292

(58) Field of Classification Search
CPC ......... B60G 17/0195; B60R 16/0315; B60T 8/1755; B60W 10/06; B60W 10/20
USPC ....... 701/1, 29.2, 3, 31.4, 36, 37, 38, 83, 94, 701/49, 50, 42, 41; 280/5.502, 5.507; 303/146, 188; 180/210, 282, 446; 296/180.1, 180.5, 181.5, 180.4; 244/87, 46, 23 A, 175, 129.1, 12.4, 12.1
See application file for complete search history.

(56) References Cited

U.S. PATENT DOCUMENTS

| | | | |
|---|---|---|---|
| 2,976,077 A * | 3/1961 | Totton, Jr. | .................. 296/180.5 |
| 3,326,318 A | 6/1967 | De Bevoise | |
| 3,512,825 A | 5/1970 | Green | |
| 4,433,865 A | 2/1984 | Crompton, Jr. | |
| 4,511,170 A * | 4/1985 | Sankrithi | ................... 296/180.1 |
| 4,925,236 A | 5/1990 | Itoh et al. | |
| 5,013,080 A * | 5/1991 | Garrone et al. | ............ 296/180.1 |
| 5,054,844 A | 10/1991 | Miwa | |
| 5,090,766 A | 2/1992 | Ito et al. | |
| 5,170,715 A * | 12/1992 | Gran et al. | ..................... 104/284 |
| 5,287,004 A | 2/1994 | Finley | |
| 5,419,608 A | 5/1995 | Takemoto | |
| 6,068,328 A * | 5/2000 | Gazdzinski | ................ 296/181.5 |
| 6,196,620 B1 * | 3/2001 | Haraway, Jr. | .............. 296/180.5 |
| 6,378,932 B1 | 4/2002 | Fasel et al. | |
| 6,575,522 B2 | 6/2003 | Borghi et al. | |
| 7,517,004 B2 | 4/2009 | Honeycutt | |
| 8,403,401 B2 * | 3/2013 | Rinehart et al. | ........... 296/180.3 |
| 2003/0001046 A1 * | 1/2003 | Carpenter | ........................ 244/82 |
| 2007/0257512 A1 * | 11/2007 | Anderson | .................. 296/180.1 |

(Continued)

FOREIGN PATENT DOCUMENTS

| | | |
|---|---|---|
| JP | 62163875 | 7/1987 |
| JP | 6156326 | 6/1994 |

*Primary Examiner* — Helal A Algahaim
*Assistant Examiner* — Jelanie Smith
(74) *Attorney, Agent, or Firm* — Snell & Wilmer LLP

(57) ABSTRACT

The automobile described herein employs an aerodynamic chassis control system to limit and/or control the affect of yaw and roll created by environmental and operating conditions on an automobile with minimal penalty to improve ride comfort and performance of the automobile. The aerodynamic chassis control system employs various movable stabilization elements to control yaw and roll. Moreover, aerodynamic chassis control system constantly monitors environmental and operating conditions of the automobile and adjusts the stabilization elements to provide ride comfort and automobile performance.

20 Claims, 6 Drawing Sheets

(56) References Cited

U.S. PATENT DOCUMENTS

| | | | |
|---|---|---|---|
| 2007/0271008 A1* | 11/2007 | Ciholas et al. | 701/3 |
| 2008/0116717 A1* | 5/2008 | Honeycutt | 296/180.5 |
| 2010/0106380 A1* | 4/2010 | Salari et al. | 701/49 |
| 2010/0270419 A1* | 10/2010 | Yoeli | 244/12.1 |
| 2011/0084170 A1* | 4/2011 | Parks | 244/129.1 |
| 2011/0130926 A1* | 6/2011 | Lu et al. | 701/42 |
| 2011/0148143 A1* | 6/2011 | Ondracek | 296/180.5 |
| 2012/0032032 A1* | 2/2012 | De Roche | 244/221 |

* cited by examiner

ACTIVE AERODYNAMIC CHASSIS CONTROL

BACKGROUND

1. Field

The present invention relates to a system and method for improved chassis control with real-time moveable aerodynamic elements.

2. Description of the Related Art

Typical components that improve the handling or control of a vehicle, such as an automobile, generally have a high penalty. For example, stiffening the suspension of an automobile generally makes an automobile more responsive during cornering maneuvers, but has a significant penalty. This penalty is the effect on passenger comfort and expensive of the stiffened suspension. Moreover, once traditional performance enhancing components are installed in the automobile it affects ride comfort in all driving conditions.

Some vehicle designs have employed a low penalty performance enhancing device such as, for example, a rear air spoiler. Under certain operating conditions, the rear air spoiler may provide an increase in vehicle performance with little penalty. In some racing and high performance applications, the air spoiler may even move in response to certain speed conditions. However, the rear air spoiler alone fails to provide adequate performance. In particular, the rear air spoiler applies downward force over a limited area of the automobile, namely the rear portion of the automobile. While this may be beneficial to limit wheel slippage, it is not beneficial to a wide range of driving conditions.

Thus, there is a need for an automobile with improved handling capabilities, where the improved handling capabilities are provided without the penalties associated with employing traditional performance enhancing components.

SUMMARY

In various exemplary embodiments, the present invention relates to an automobile comprising a chassis, a plurality of wheels, an engine, a body, a control unit and a chassis stabilization system. The wheels are rotatably coupled to the chassis. The engine is mounted to the chassis and configured to engage and drive the wheels. The body is mounted on the chassis and configured to at least partially enclose the engine. The control unit is in electronic communication with the engine and is configured to manage the operation of the engine. The chassis stabilization system comprises a first moveable aerodynamic element and a second movable aerodynamic element. The first movable aerodynamic element is movably installed on the body and configured to control yaw. The second moveable aerodynamic element is movably installed on the chassis and configured to control roll. The chassis stabilization system is also in electronic communication with the control unit, such that, the control unit moves at least one of the first moveable aerodynamic element and/or the second moveable aerodynamic element in response to an event (e.g., a yaw condition or a roll condition on the automobile caused by an environmental and/or operating condition).

In exemplary embodiments, the automobile further comprises a plurality of sensors configured to detect environmental events. The sensors provide feedback that is representative of the environment to the control unit, such that, the control unit causes the chassis stabilization system to respond to the environmental event. These environmental events may include, for example, cross winds, bumps, road slope, tire pull, pot holes, a low traction driving surface, and/or a winding road. As such, the chassis stabilization system controls at least one of yaw and/or roll in response to the environmental event.

In various embodiments, the automobile comprises a plurality of sensors configured to detect driver events. These sensors provide feedback indicative of the environmental event to the control unit and cause the chassis stabilization system to respond to the user event. The driver events may include turning, changing lanes, rapid acceleration and/or deceleration. As such, the chassis stabilization system controls yaw and/or roll in response to the driver events.

In exemplary embodiments, the chassis control system comprises a plurality of first movable aerodynamic elements. These first moveable aerodynamic elements are moveably installed at a plurality of locations on the body and the chassis, such that, a plurality of corresponding forces are distributed to the body and the chassis to control yaw. In these embodiments, the first moveable aerodynamic element may be a fin, a paddle, a foil, or any other suitable device.

In various embodiments, the chassis control system comprises a plurality of second movable aerodynamic elements. These second moveable aerodynamic elements are moveably installed at a plurality of locations on the chassis, such that, a plurality of corresponding forces are distributed to the chassis to control roll. In these embodiments, the second moveable element may be a fin, a paddle, a foil, or any other suitable device.

In various exemplary embodiments, the present invention relates to an automobile comprising a chassis, a body, a plurality of sensors, a control unit, and a chassis stabilization system. The chassis has a first side and a second side. The body is mounted on the chassis. The plurality of sensors are distributed across the automobile and configured to detect environmental events and operating events. The control unit is in electronic communication with the plurality of sensors and the chassis stabilization system.

In these embodiments, the chassis stabilization system comprises a first fin and a second fin. The first fin is movably installed on the body and is configured to control yaw. The second fin is movably installed on the chassis and is also configured to control yaw. The first fin is configured to distribute a corresponding first force to the body and the second fin is configured to distribute a corresponding second force to the chassis. Moreover, the first fin and the second fin are positioned by the control unit such that the first force complements the second force to control yaw.

In these embodiments, the chassis stabilization system also comprises a first paddle and a second paddle. The first paddle is movably coupled to the first side of the chassis and is configured to control roll. The second paddle is movably coupled to the second side of the chassis and is also configured to control roll. The first paddle is configured to distribute a corresponding third force to the first side of the chassis and the second paddle is configured to distribute a corresponding fourth force to the second side of the chassis. The first paddle and the second paddle are positioned by the control unit such that the third force opposes the fourth force to control yaw.

In various exemplary embodiments, the present invention relates to methods for stabilizing an automobile. These methods employ an aerodynamic chassis control system comprising an electronic control unit, a yaw control element and a roll control element. The aerodynamic chassis control system is configured to actuate the yaw control element in response to a first yaw event being detected by the electronic control unit and commands the yaw control element to a first yaw position to control the yaw event. The aerodynamic chassis control system is also configured to actuate the roll control element in response to a first roll event being detected by the electronic control unit and commands the roll control element to a first roll position to control the roll event. The aerodynamic chassis control unit monitors the response of the automobile to the first yaw position and/or the first roll position and monitors the response of the automobile to environmental and/or operating conditions or events.

Based on this continued monitoring, the aerodynamic chassis control unit can adjust the yaw control element to a second yaw position and/or the roll control element to a second roll position in response to a detected environmental condition and/or operating condition. Moreover, the aerodynamic chassis control unit can disengage the yaw control element and/or the roll control element in response to not detecting a second yaw event and/or a second roll event.

In various embodiments, the yaw control element or various combinations of yaw control elements are out of phase in response to the automobile operating at a first speed condition (e.g., a low speed operating condition). In these embodiments, the yaw control element or various combinations of yaw control elements are in phase in response to the automobile operating at a second speed condition (e.g., a high speed operating condition).

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Figure 1:
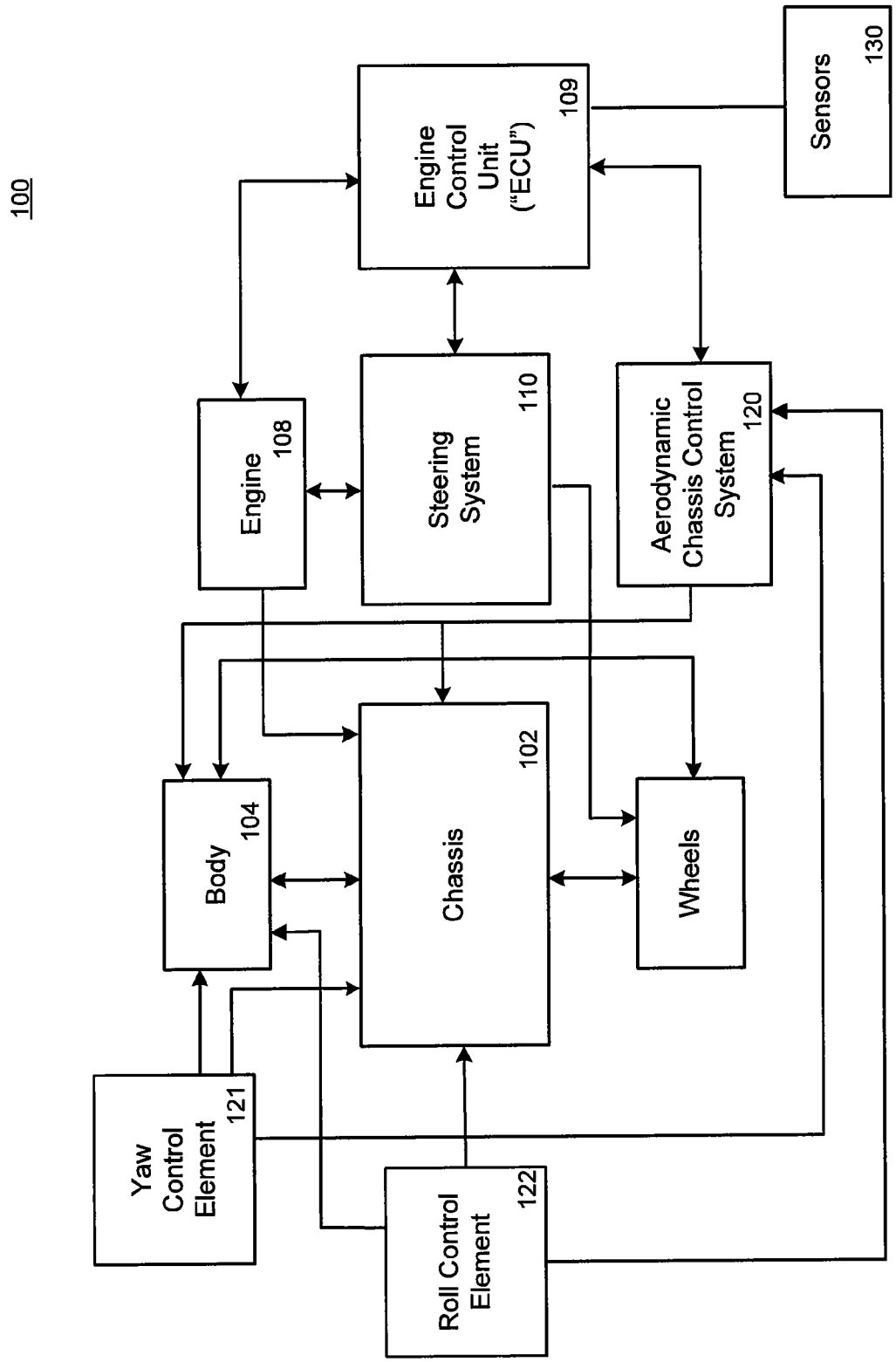
FIG. 1 is a box diagram of an automobile including an engine and an aerodynamic chassis control system in accordance with an embodiment.

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

In various exemplary embodiments, an aerodynamic chassis control system may be any system configured to create aerodynamic forces on an automobile. More specifically, the aerodynamic chassis control system may be configured to control yaw and roll of an automobile. The system creates these aerodynamic forces in real time or substantially real time in response to events. For example, these forces may be created in response to driver inputs (e.g., turning, changing lanes, rapid acceleration or deceleration, and/or the like) to the automobile or environmental inputs caused by environment conditions (e.g., cross winds, road slope, tire pull, pot holes, bumps, a low traction driving surface, a winding road, and/or the like) when the automobile is in use.

In various embodiments, the aerodynamic chassis control system may comprise stabilization elements. These stabilization elements are designed to engage the air to create aerodynamic forces. These stabilizations elements are also moveable to effectively create aerodynamic forces at any angle and under any condition. Moreover, these stabilization elements are configured to respond to environmental and operating conditions in real time. As such, the stabilization elements can be positioned in hundredths or thousandths of a second to insure that a condition (e.g., yaw or roll), such that the condition may not be perceived by the driver in a substantial way and has a minimal effect on the operation of the automobile.

In operation, these stabilization elements create aerodynamic forces (e.g., inputs on the automobile) at speeds over approximately 20 miles per hour. These aerodynamic forces can be employed over a range of operating conditions in varying configurations to improve ride comfort and performance. For example, during low speed operation of an automobile the stabilization elements may be employed out of phase with the operation of the automobile. During high speed operation of an automobile the stabilization elements may be employed in phase with the operation of the automobile so that the aerodynamic forces created by the stabilization elements stabilize the maneuverability of the automobile (e.g., control yaw and/or roll). In various embodiments, low speed operation may occur at speeds below approximately 35 mph to 45 mph, and high speed operation may occur at speeds above approximately 35 mph to 45 mph. More specifically, in these embodiments, low speed operation may occur at speeds below approximately 40 mph, and high speed operation may occur at speeds above approximately 40 mph.

As noted above, increasing performance parameters of an automobile with traditional performance enhancing systems have typically come with a high penalty, which generally amounts to an increase in ride discomfort for the driver and passengers of an automobile. However, incorporation of the aerodynamic chassis control system into an automobile provides performance benefits that are substantially equivalent to traditional performance enhancing systems (e.g., a high performance suspension), with substantially no increase in penalty. In other words, an automobile with an aerodynamic chassis control system, as disclosed herein, has performance characteristics that are substantially similar to automobiles with traditional performance enhancing systems, but without an increase in penalty (e.g., ride discomfort) associated with the traditional performance enhancing systems.

In an exemplary embodiment and with reference to FIG. 1, an automobile 100 generally comprises a chassis 102, a body 104, wheels 106, an engine 108, an electronic control unit ("ECU") 109, and/or a steering system 110. The automobile 100 also comprises an aerodynamic chassis control system 120 and one or more sensors 130. In these embodiments, the body 104 mounts and couples to the chassis 102. The chassis 102 rotatably couples to the wheels 106. The engine 108 mounts and is supported by the chassis 102 and is at least partially enclosed by the body 104. The steering system 110 provides inputs to the wheels 106 and the engine 108 and/or the ECU 109. The ECU 109 is in electronic communication with the engine 108 and is installed at any suitable location within the automobile 100. The aerodynamic chassis control system 120 is also in electronic communication (e.g., wireless and/or wired) with the ECU 109 and may be installed at one of more suitable locations within the automobile 100. The sensors 130 may be installed at any suitable position within the automobile 130 and may electronically communicate with the ECU 109.

The engine 108 primarily drives the wheels 106. The engine 108 may be any suitable motor configured to consume electricity, fuel and/or energy and output power such as, for example, an internal combustion engine, an electric motor, a hybrid internal combustion engine-electric motor, or any other suitable power generation system, which is suitable to move the automobile 100. The steering system 110 may comprise one or more user inputs such as, for example, a brake, a steering wheel, and an accelerator. The steering system 110 receives inputs through the user inputs and communicates those inputs to the wheels 106, the engine 108, and/or the ECU 109.

In various embodiments, the aerodynamic chassis control system 120 may be any system configured to control yaw and roll in an automobile. In one embodiment, the aerodynamic chassis control system 120 comprises one or more yaw control elements 121 and one more roll control elements 122. In this embodiment, each of the yaw control elements 121 and the roll control elements 122 are movable. For example, the yaw control elements 121 and the roll control elements 122 may be coupled to a system configured with pneumatic, electric, electromagnetic, and/or hydraulic actuators. These actuators are configured to move the yaw control elements 121 and the roll control elements 122 in any suitable fashion. Moreover, the yaw control elements 121 and the roll control elements 122 may couple to any suitable mechanism(s) that provide movement.

In various embodiments, the sensors 130 may be configured to monitor, detect, measure, observe, or otherwise sense environmental and operating conditions of the automobile 100. As noted above, the sensors 130 may be installed in any suitable location. For example, one or more of the sensors 130 may be installed on the body 104 to detect wind conditions such as, for example, a cross wind, a head wind, or a tail wind. One or more sensors 130 may operatively couple to or monitor the wheels 106 to determine vehicle speed, wheel slippage, turning events, or any other suitable parameter.

Figure 2:
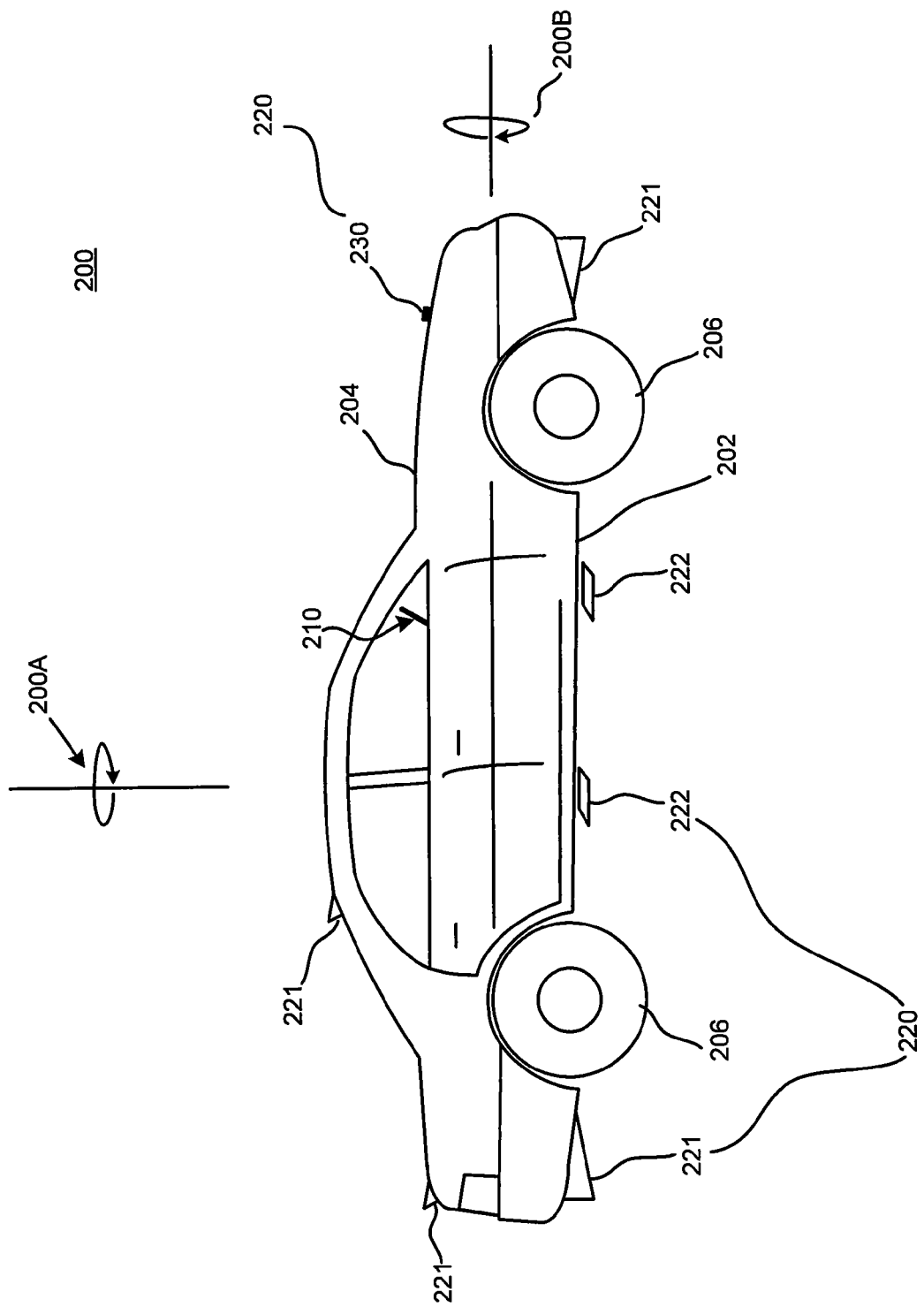
FIG. 2 illustrates a side view of an automobile configured with an aerodynamic chassis control system and includes a general indication of the rotational movement or force of yaw and roll in accordance with an embodiment.

In an exemplary embodiment and with reference to FIG. 2, the aerodynamic chassis control system 220 may be any system configured to control the yaw and/or the roll of the automobile 200 in substantially real-time. The aerodynamic chassis control system 220 is configured to detect environmental and operating conditions that cause yaw and roll and adjust various system components to control the effects of yaw and roll on the automobile 200.

As used herein, "yaw" means rotation movement of or force applied to the automobile 200 about a vertical axis of the automobile 200. For example, yaw is illustrated by the arrow shown about the vertical axis at 200A.

As used herein, "roll" or "body roll" means rotational movement of or force applied to the automobile 200 about a horizontal axis of the automobile 200. For example, roll is illustrated to the arrow shown about the horizontal axis at 200B.

In various embodiments, the aerodynamic chassis control system 220 comprises one or more yaw control elements 221. The yaw control element 221 may be any suitable mechanism or device configured to create an aerodynamic force that controls yaw on the automobile 200. More specifically, the yaw control element 221 may be configured to increase and/or decrease the yaw rate depending on various factors, including for example, the speed of the automobile 200, the yaw event occurring at the automobile 200, or the input provided by a driver. For example, during a cornering maneuver, the yaw control element 221 may be configured to increase the yaw rate of the automobile 200 to make the automobile 200 more responsive. During a crosswind event, the yaw control element 221 may be configured to decrease the yaw rate of the automobile 200 to counteract the effects of the crosswind and stabilize the automobile 200. These yaw control elements 221 may be installed at any suitable location on the automobile 20Q. The yaw control elements 221 are also moveable. In one embodiment, the yaw control element 221 is a fin, a paddle, a flap, a foil or other suitable device configured to create an aerodynamic force. The yaw control elements 221 comprise or couple to movement mechanisms such as, for example, an electric actuator, an electromagnetic actuator, a pneumatic actuator, a hydraulic actuator, a linkage and drive assembly, or any other suitable movement mechanism. Moreover, the yaw control elements 221 or the movement mechanisms may be configured with position detect and feed back mechanisms that monitor the positions of the yaw control elements 221. These movement mechanisms may include, for example, potentiometers, sensors, or other suitable feedback mechanisms.

The yaw control element 221 may be of any suitable size or shape. In one embodiment, the yaw control element 221 is shaped to engage the air and create an aerodynamic force on the automobile 200. Where the yaw control element 221 is a fin, the yaw control element 221 has a geometry that is generally triangular. Where the yaw control element 221 is a paddle or a flap, the yaw control element 221 has a geometry that is generally rectangular. However, in various embodiments, the yaw control element 221 may have a circular geometry, an oval geometry, an oblong geometry, non-uniform geometry, or any other suitable geometry that is configured to engage air. In another embodiment, the yaw control element 221 has a geometry that is complimentary to the automobile 200 and is capable of engaging air. For example, the yaw control element 221 may be designed or shaped to be aesthetically pleasing or otherwise integrate with the automobile 200, while engaging the air to create sufficient aerodynamic force to control yaw on the automobile 200.

In an embodiment, the aerodynamic chassis control system 220 comprises one of more roll control elements 222. The roll control element 222 may be any suitable mechanism or device configured to create an aerodynamic force to control the effect of roll on the automobile 200. Typically, the roll control element 222 minimizes roll of the automobile 200 during operation. However, in certain embodiments, the roll control element 222 may be configured to increase roll to achieve a desired operating condition. These roll control elements 222 may be installed at any suitable location on the automobile 200. The roll control elements 222 are also moveable. In one embodiment, the roll control element 222 is a fin, a paddle, a flap, a foil or other suitable device configured to create an aerodynamic force. The roll control elements 222 comprise or couple to a movement mechanism such as, for example, an electric actuator, electromagnetic actuator, a pneumatic actuator, a hydraulic actuator, a linkage and drive assembly, or any other suitable movement mechanism. Moreover, the roll control elements 222 or the movement mechanisms may be configured with position detect and feed back mechanisms that monitor the positions of the roll control elements 222. These movement mechanisms may include, for example, potentiometers, sensors, or other suitable feedback mechanisms.

The roll control element 222 may be of any suitable size or shape. In one embodiment, the roll control element 222 is shaped to engage the air and create an aerodynamic force on the automobile 200. Where the roll control element 222 is a fin, the roll control element 222 has a geometry that is generally triangular. Where the roll control element 222 is a paddle or a flap, the roll control element 222 has a geometry that is generally rectangular. However, in various embodiments, the roll control element 222 may have a circular, oval, oblong, non-uniform, or any other suitable geometry configured to the air. In another embodiment, the roll control element 222 has a geometry that is complimentary to the automobile 200 and is capable of engaging the air. For example, the roll control element 222 may be designed or shaped to be aesthetically pleasing or otherwise integrate with the automobile 200 while still engaging a fluid to provide sufficient aerodynamic force to counteract roll on automobile 200.

In various embodiments and with continued reference to FIG. 2, the aerodynamic chassis control system 220 also comprises an algorithm that is operable on the ECU 109 or on a stand alone electronic control unit. The algorithm analyzes data from one or more of the sensors 230 to adjust one or more of the yaw control elements 221 and/or one or more of the roll control elements 222 to control the effects of yaw and/or roll created by environmental conditions and/or operating conditions. The algorithm is configured to analyze the various conditions detected by the sensors 230 to determine an appropriate response to stabilize the automobile 200 by controlling the yaw and/or the roll. Moreover, each of these various conditions may require that the ECU, based on the output of the algorithm, command particular yaw control elements 221 and/or roll control elements 222. Put another way, the aerodynamic chassis control system 220 may actuate some, but not all, of the yaw control elements 221 and/or the roll control elements 222 to control a detected operating condition and/or environmental condition.

In operation, the algorithm and the ECU 109 are also configured to determine and control the position of the various yaw control elements 221 and roll control elements 222. More specifically, in an embodiment, the ECU 109 is in electronic communication with one or more of the movement mechanisms, discussed above, that control the positions of the yaw control elements 221 and the roll control elements 222.

In an embodiment, one or more sensors 230 may detect an environmental condition, such as a cross wind. In this embodiment, the sensors 230 may detect a force exerted on the automobile 200. With a traditional automobile, this force would require that an operator or driver of the automobile adjust a driving parameter of the automobile such as, brake, speed and/or steering to compensate for the force created by the environmental condition. The yaw also creates an uncomfortable ride for the driver and/or passengers of the automobile 200. The yaw may require the driver and/or passengers to brace themselves or may cause them to shift depending on the magnitude of the yaw. However, the automobile 200 with the aerodynamic chassis control system 220 is configured to compensate for the environmental condition before the driver adjusts the automobiles operating parameters. For example, in this embodiment, the algorithm determines that the detected crosswind causes a yaw and adjusts the aerodynamic chassis control system 220 to counteract the yaw on the automobile 200 (e.g. decrease the yaw rate). More specifically, based on the environmental parameter detected by the sensors 230 (e.g., the direction and strength of the force exerted by the wind on the automobile 200), the algorithm adjusts the yaw control elements 221 to control the yaw rate of the automobile 200.

In another embodiment, one or more sensors 230 may detect an operating condition, such as a turn or cornering maneuver initiated by a driver. The sensors 230 may detect a roll force caused by the maneuver. With a traditional automobile, this force would require that an operator or driver of the automobile adjust a driving parameter of the automobile, such as reducing speed or braking, to compensate for the roll force created by the operating condition. The roll also creates an uncomfortable operating condition for the driver and/or passengers, requiring them to brace or be jostled as the roll causes the automobile 200 to cant. However, the automobile 200 with the aerodynamic chassis control system 220 is configured to compensate for the environmental condition before the driver adjusts the automobiles operating parameters. For example, one or more roll control elements 222 may be moved and/or adjusted to exert an aerodynamic force on the automobile 200. For example, in this embodiment, the algorithm determines that the detected crosswind causes a yaw event and adjusts the aerodynamic chassis control system 220 to control the yaw on the automobile 200. More specifically, based on the environmental parameter detected by the sensors 230 (e.g., the direction and strength of the force of the roll on the automobile 200), the algorithm adjusts the roll control elements 222 to counteract the roll forces exerted on the automobile 200 during the maneuver.

In yet another embodiment, one or more sensors 230 may detect one or more operating conditions and one or more environmental conditions. The sensors 230 may also detect yaw and/or roll causes by the operating and environmental conditions. In this embodiment, the ECU 109 analyzes the yaw and/or roll detected by the sensors 230. Based on the algorithm, the ECU 109 positions the yaw control elements 221 and/or the roll control elements 222 to control the yaw and/or the roll on the automobile 200.

In an exemplary embodiment, the aerodynamic chassis control system 220 stabilizes the automobile 200 by controlling the yaw and/or roll of the automobile 200. As such, the aerodynamic chassis control system 220 may be configured to sense, detect, measure or otherwise evaluate the effect of stabilization forces exerted on the automobile 200 by the yaw control elements 221 and the roll control elements 222 to insure that these stabilization forces do not cause an over correction. Put another way, the aerodynamic chassis control system 220 operates and adjusts in real time to control the effects of yaw and/or roll while not overcorrecting the yaw and/or the roll.

Figure 3A:
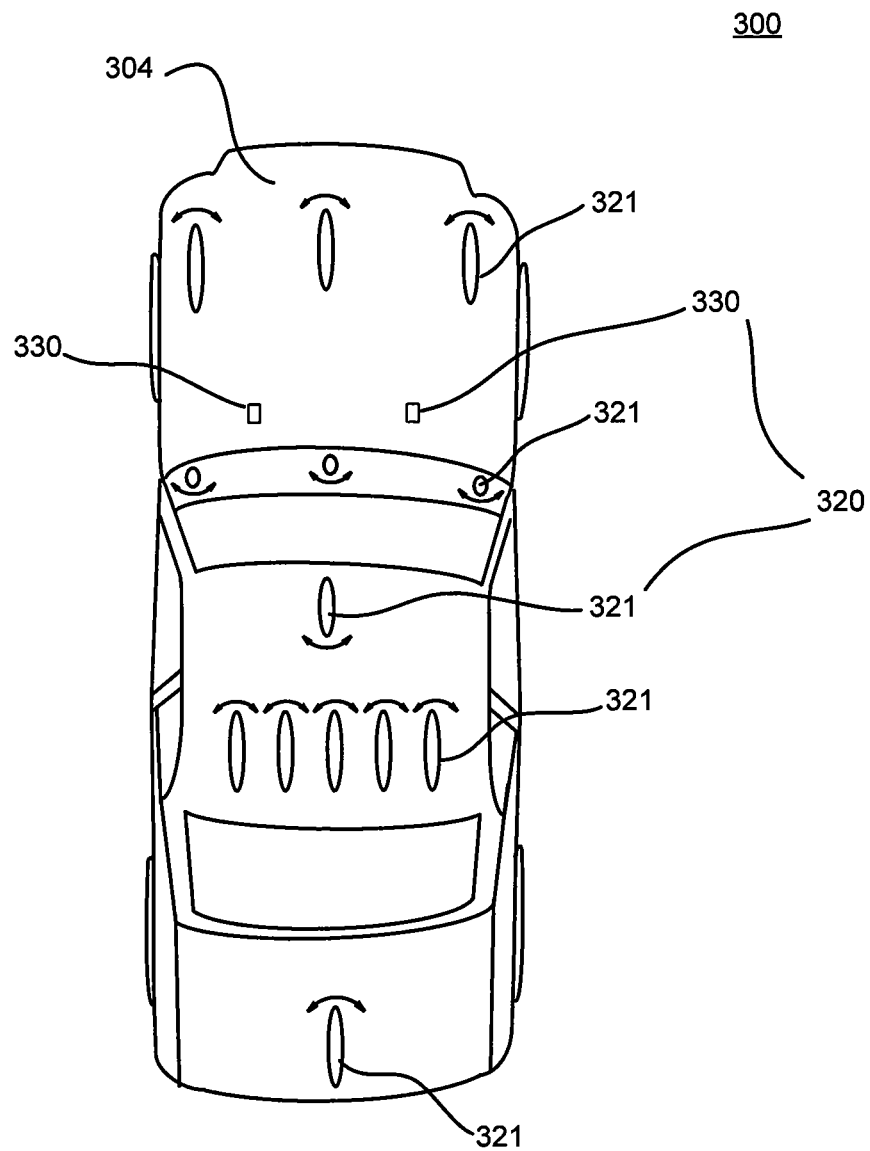
FIG. 3A illustrates a top view of an automobile configured with an aerodynamic chassis control system in accordance with an embodiment.
Figure 3B:
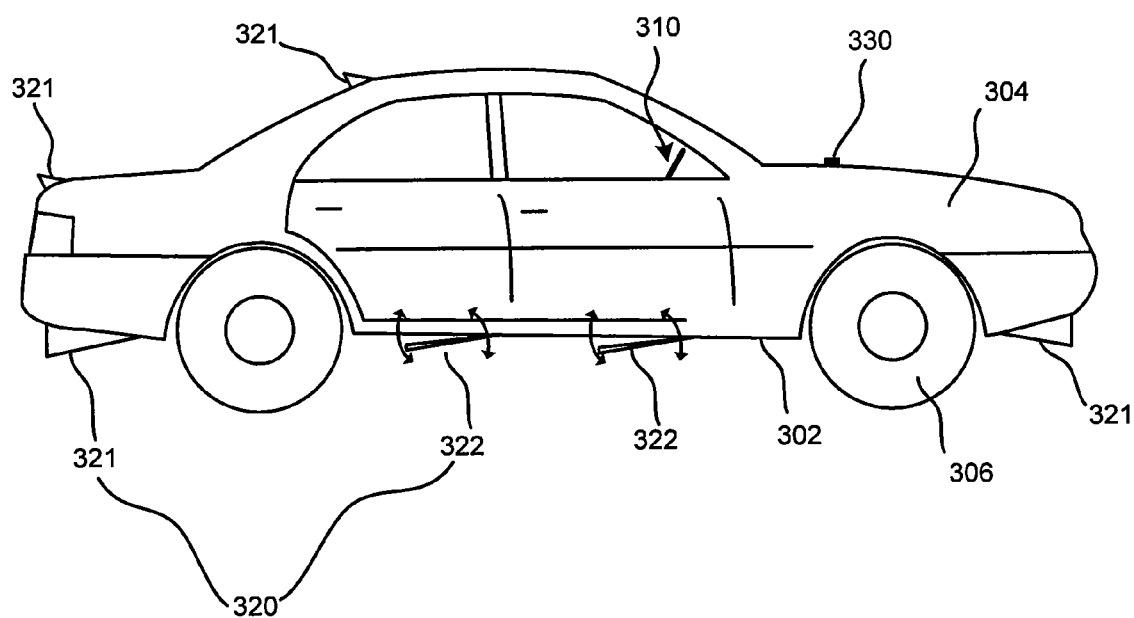
FIG. 3B illustrates a side view of an automobile configured with an aerodynamic chassis control system in accordance with an embodiment.
Figure 3C:
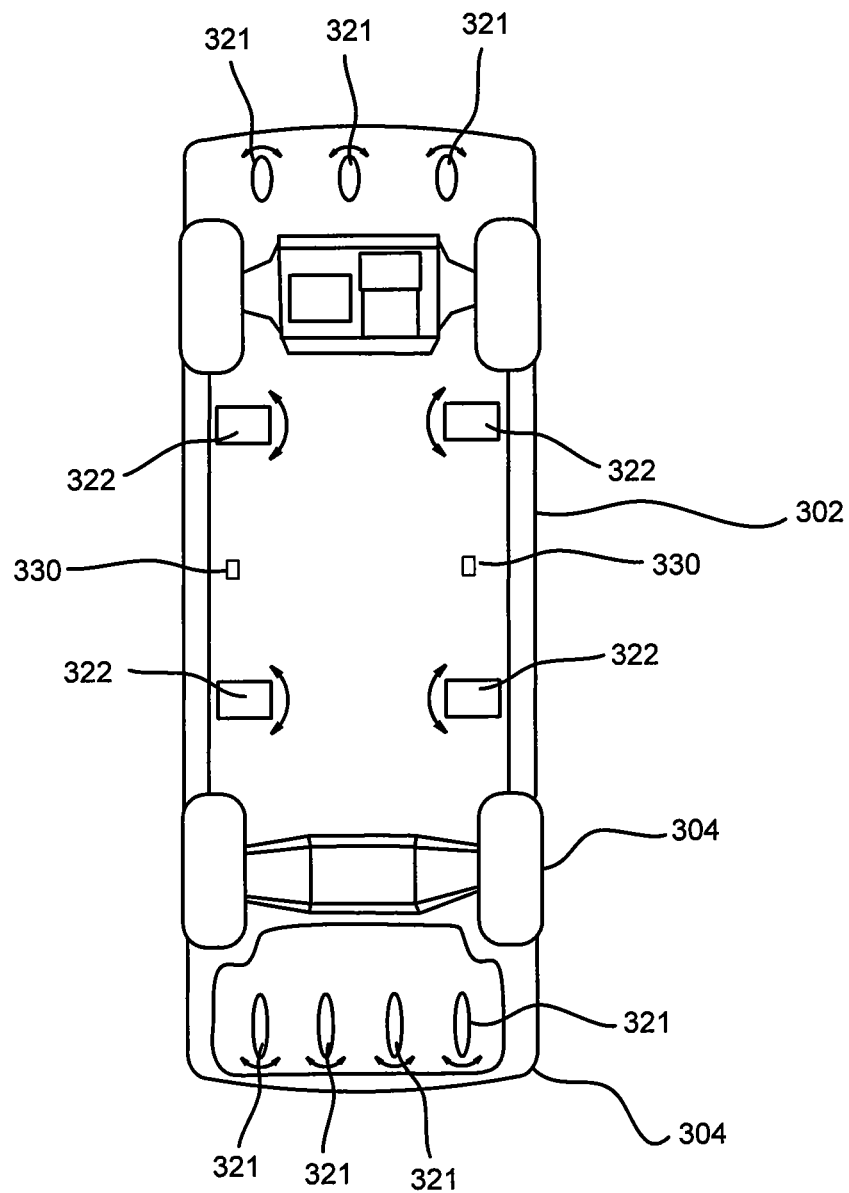
FIG. 3C illustrates a bottom view of an automobile configured with an aerodynamic chassis control system in accordance with an embodiment.

In an embodiment and with reference to FIG. 3A, FIG. 3B and FIG. 3C, the aerodynamic chassis control system 320 may be installed, integrated, or otherwise configured in the automobile 300 in any suitable fashion. Moreover, various components of the aerodynamic chassis control system 320 may be installed at various suitable locations on the body 304 and/or the chassis 302. Generally, the aerodynamic chassis control system 320 can be installed at various locations that allow effective creation of aerodynamic forces while allowing for efficient packaging of the automobile 300 with relatively low visibility. For example, the yaw control elements 321 may be installed on the leading edge of the undercarriage of the automobile 300 (e.g., in the region below the radiator) and on the trailing edge of the automobile 300 (e.g., in the region below or proximate to the bumper). Moreover, the roll control elements 322 may be installed along the undercarriage of the automobile 300 along the outside edges of the undercarriage (e.g., set away from the centerline from the automobile 300 to create an effective torsion force as a result of the force created by the roll control element 322 about the centerline of the automobile 300).

In an exemplary embodiment, one or more yaw control elements 321 may be installed on both the body 304 and the chassis 302. In one embodiment, one or more relatively large yaw control elements 321 may be installed at any suitable location(s) on the automobile 300. In another embodiment, the relatively small yaw control elements 321 may be installed at various locations on the automobile 300. This distributed installation allows the aerodynamic chassis control system 320 to provide effective stabilization with the relatively small yaw control elements 321, without detracting from the overall design and/or packaging requirements of the automobile 300. Moreover, the distributed installations distribute the forces created by the yaw control elements 321 over a larger area of the automobile 300.

Like the yaw control elements discussed above, in exemplary embodiments, one or more roll control elements 322 may be installed on both the body 304 and the chassis 302. Typically, a roll force exerted on the automobile 300 causes one side of the automobile 300 to lift up as the other side of the automobile 300 sits down. In operation during a cornering maneuver, the side of the automobile 300 to the inside of the cornering maneuver tends to lift or move up and the side of the automobile 300 on the outside of the cornering maneuver tends to sit or move down. As such, the roll control elements are designed to exert a force opposing the roll to minimize the roll angle during a maneuver.

In one embodiment, one or more relatively large roll control elements 322 may be installed at any suitable location(s) on the automobile 300. In another embodiment, the relatively small roll control elements 322 may be installed at various locations on the automobile 300. This distributed installation allows the aerodynamic chassis control system 320 to provide effective stabilization with the relatively small roll control elements 322, without detracting from the overall design and/or the packaging requirements of the automobile 300. Moreover, the distributed installations distribute the forces created by the roll control elements 322 over a larger area of the automobile 300.

Further, in various embodiments, scaling of the yaw control elements 321 and the roll control elements 322 (collectively, "stabilization elements") are approximately linear. As such, relatively small stabilization elements may be employed at various locations on the automobile 300 to provide an effect that is equivalent to employing one or a few large stabilization elements, where the area of multiple relatively stabilization elements is equivalent to the area of a few relatively larger stabilization elements.

In a typical automobile with a spoiler, the aerodynamic force created by the spoiler is applied to the rear of the automobile to help maintain rear wheel traction. However, in an embodiment, where the stabilization elements are distributed across the surface area of the automobile 300, on both the chassis 302 and the body 304, the stabilization elements distribute forces at the points of attachment of the stabilization elements. Thus, the distributed installation distributes forces over the automobile 300, providing more uniform distribution of aerodynamic forces to control the yaw and/or the roll.

In custom applications such as for high performance automobiles or racing automobiles, it may be desirable to employ relatively larger stabilization elements to create forces at specific points on the automobile. However, in various embodiments integrated with automobiles such as a typical passenger car or a sport utility vehicle (SUV), it may be desirable to integrate relatively smaller stabilization elements. As such, the exemplary aerodynamic chassis control systems contemplated herein, are both relatively larger stabilization elements and relatively smaller stabilization elements and may be implemented interchangeably to control yaw and/or roll in any application.

Figure 4:
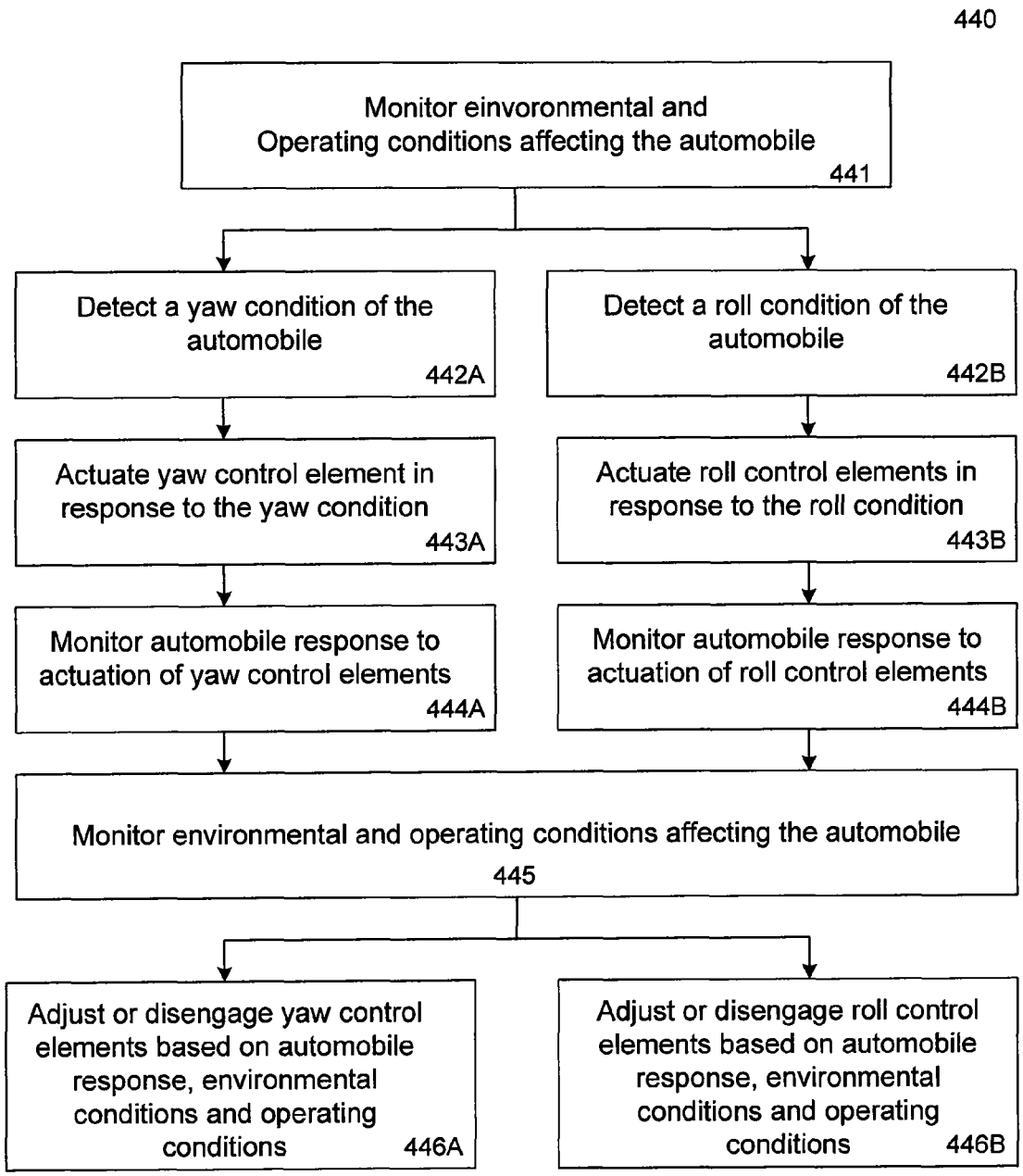
FIG. 4 is a box diagram of a control process of an aerodynamic chassis control system in accordance with an embodiment.

In an embodiment and with reference to FIG. 4, the aerodynamic chassis control system may be configured to perform a process 440 to stabilize the automobile. In an embodiment, the aerodynamic chassis control system may be configured to monitor environmental and operating conditions affecting the automobile (Step 441). As noted above, these environmental and operating conditions can create yaw and roll conditions that effect the ride comfort of the driver and/or passengers of the automobile. As such, process 440 detects a yaw condition of the automobile (Step 442A) or detects a roll condition of the automobile (Step 442B). The conditions may be detected simultaneously, substantially simultaneously, in response to one another, or as separate events. In response to yaw and/or roll conditions being detected, the aerodynamic chassis control system actuates a yaw control element (Step 443A) and/or actuates a roll control element (Step 443B). The stabilization elements control the yaw and/or roll events to improve the ride, responsiveness and overall performance of the automobile. The aerodynamic chassis control system also monitors the response of the automobile to the actuation of the yaw control element (Step 44A) and/or monitors the response of the automobile to the actuation of the roll control element (Step 44B). The aerodynamic chassis control system also continuously monitors the environmental and operating conditions affecting the automobile (Step 445). Based on the response of the automobile to the actuation of the stabilization elements, the environmental conditions, and the operating conditions, the aerodynamic chassis control system may adjust and/or disengage one or more yaw control elements (Step 446A). Similarly, based on the response of the automobile to the actuation of the stabilization elements, the environmental conditions, and the operating conditions, the aerodynamic chassis control system may adjust and/or disengage one or more yaw control elements (Step 446B).

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Thus, the automobile described herein employs an aerodynamic chassis control system to limit and/or control the affect of yaw and roll created by environmental and operating conditions on an automobile with minimal penalty to improve ride comfort and performance of the automobile.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An automobile having a yaw axis and a roll axis, comprising:
   a chassis;
   a plurality of wheels rotatably coupled to the chassis;
   an engine mounted to the chassis and configured to engage and drive the plurality of wheels;
   a body mounted on the chassis and configured to at least partially enclose the engine;
   a control unit in electronic communication with the engine and configured to manage an operation of the engine;
   a chassis stabilization system including:
      a first plurality of moveable aerodynamic elements movably installed on the body of the automobile, the first plurality of moveable aerodynamic elements being configured to cause a first plurality of forces to be applied to and distributed over the body of the automobile to control a yaw movement of the automobile about the yaw axis, and
      a second moveable aerodynamic element movably installed on the chassis and configured to cause a second force to be applied to the automobile to control a roll movement of the automobile about the roll axis, wherein the chassis stabilization system is in electronic communication with the control unit such that the control unit is configured to move at least one of the first plurality of moveable aerodynamic elements or the second moveable aerodynamic element in response to a driver event or an environmental event;
   a first plurality of sensors configured to detect a feedback yaw effect of the applied first plurality of forces and a feedback roll effect of the applied second force; and
   a second plurality of sensors configured to iteratively detect a feedback environmental condition,
   wherein the first plurality of moveable aerodynamic elements are configured to cause a first plurality of response forces to be applied to the automobile to control the yaw movement of the automobile about the yaw axis based on the feedback yaw effect and the feedback environmental condition, and
   wherein the second moveable aerodynamic element is configured to cause a second response force to be applied to the automobile to control the roll movement of the automobile about the roll axis based on the feedback roll effect and the feedback environmental condition.

2. The automobile of claim 1, wherein the environmental event includes at least one of cross winds, pot holes, a low traction driving surface, or a winding road.

3. The automobile of claim 1, further comprising a third plurality of sensors configured to detect the driver event, and wherein the control unit is configured to cause the chassis stabilization system to respond to the driver event.

4. The automobile of claim 1, wherein the driver event includes at least one of turning, changing lanes, or rapid acceleration or deceleration.

5. The automobile of claim 1, wherein the chassis stabilization system comprises a third plurality of movable aerodynamic elements positioned on the chassis and configured to cause a third plurality of forces to be applied to and distributed over the chassis, wherein the applied first plurality of forces distributed over the body of the automobile along with the applied third plurality of forces distributed over the chassis control the yaw movement of the automobile about the yaw axis.

6. The automobile of claim 1, wherein the chassis stabilization system comprises a fourth plurality of movable aerodynamic elements, and wherein the fourth plurality of moveable aerodynamic elements are moveably installed on the chassis, such that the fourth plurality of moveable aerodynamic elements cause a fourth plurality of forces to be applied to and distributed over the chassis such that the applied second force along with the applied fourth plurality of forces control the roll movement of the automobile about the roll axis.

7. The automobile of claim 1, wherein the first plurality of moveable aerodynamic elements are a plurality of fins, and the plurality of fins are configured to cause the first plurality of response forces to be applied to counteract a first overcorrection in the yaw movement of the automobile as a result of the applied first plurality of forces, and the second moveable aerodynamic element is configured to cause the second response force to be applied to counteract a second overcorrection in the roll movement of the automobile as a result of the applied second force.

8. The automobile of claim 1, wherein
   the second moveable aerodynamic element is a paddle,
   the feedback yaw effect includes a first yaw movement of the automobile, and the feedback roll effect includes a first roll movement of the automobile, the first plurality of sensors are configured to detect the first yaw movement and the first roll movement, the control unit is configured to determine whether the first yaw movement results in a first overcorrection in the yaw movement of the automobile, and whether the first roll movement results in a second overcorrection in the roll movement of the automobile, the first plurality of moveable aerodynamic elements are configured to cause the first plurality of response forces to be applied to the automobile to counteract the first overcorrection in the yaw movement, and the paddle is configured to cause the second response force to be applied to the automobile to counteract the second overcorrection in the roll movement.

9. An automobile having a yaw axis and a roll axis, the automobile comprising:
   a chassis;
   a body having a rear portion and a front portion, the body of the automobile being mounted on the chassis;
   a plurality of sensors distributed across the automobile and configured to detect environmental events and driver events;
   a control unit in electronic communication with the plurality of sensors; and
   a chassis stabilization system, including:
      a first plurality of fins movably installed on a first plurality of fin locations under the automobile and configured to cause a first plurality of forces to be applied to and distributed under the automobile to control a yaw movement or rotation of the automobile about the yaw axis, and
      a first plurality of paddles movably installed on a first plurality of paddle locations under the automobile and configured to cause a second plurality of forces to be applied to and distributed over the body of the automobile to control a roll movement or rotation of the automobile about the roll axis,
   wherein the plurality of sensors are configured to detect a feedback yaw effect of the applied first plurality of forces, a feedback roll effect of the applied second plurality of forces and a feedback environmental condition,
   wherein the first plurality of fins are configured to cause a first plurality of response forces to be applied to the automobile to control the yaw movement or rotation of the automobile about the yaw axis based on the feedback yaw effect and the feedback environmental condition, and
   wherein the first plurality of paddles are configured to cause a second plurality of response forces to be applied to the automobile to control the roll movement or rotation of the automobile about the roll axis based on the feedback roll effect and the feedback environmental condition.

10. The automobile of claim 9, further comprising:
   a second fin movably installed on a second fin location on the body of the automobile and configured to cause a third force to be applied to the automobile such that the applied first plurality of forces and the applied third force are distributed over the body of the automobile and the chassis to control the yaw movement or rotation of the automobile about the yaw axis.

11. The automobile of claim 10, wherein the first plurality of fins and the second fin are positioned by the control unit such that the applied first plurality of forces complement the applied third force to control the yaw movement or rotation of the automobile about the yaw axis.

12. The automobile of claim 9, wherein at least one of the first plurality of paddles is located on a first side of the chassis and at least one of the first plurality of paddles is located on a second side of the chassis to distribute the applied second plurality of forces over the first side and the second side of the chassis for controlling the roll movement or rotation of the automobile about the roll axis.

13. A method for stabilizing an automobile which has a yaw axis and a roll axis, the method comprising:
   providing an aerodynamic chassis control system comprising an electronic control unit, a plurality of yaw control elements installed on a body of the automobile and a plurality of roll control elements installed under the automobile;
   actuating the plurality of yaw control elements in response to a first driver event or a first environmental event being detected by the electronic control unit, wherein the electronic control unit is configured to command the plurality of yaw control elements to cause a first plurality of forces to be applied to and distributed over the body of the automobile for controlling a yaw movement of the automobile about the yaw axis in response to the first driver event or the first environmental event;
   actuating the plurality of roll control elements in response to a second driver event or a second environmental event being detected by the electronic control unit, wherein the electronic control unit is configured to command the plurality of roll control elements to cause a second plurality of forces to be applied to and distributed under the automobile for controlling a roll movement of the automobile about the roll axis;
   detecting, using a first plurality of sensors, a feedback yaw effect of the applied first plurality of forces and a feedback roll effect of the applied second plurality of forces;
   iteratively detecting, using a second plurality of sensors, a feedback environmental condition;
   causing, using the plurality of yaw control elements, a first plurality of response forces to be applied to the automobile to control the yaw movement of the automobile about the yaw axis based on the feedback yaw effect and the feedback environmental condition; and
   causing, using the plurality of roll control elements, a second plurality of response forces to be applied to the automobile to control the roll movement of the automobile about the roll axis based on the feedback roll effect and the feedback environmental condition.

14. The method of claim 13, further comprising detecting at least one of the first driver event, the first environmental event, the second driver event or the second environmental event.

15. The method of claim 13, further comprising:
   adjusting at least one of the applied first plurality of forces or the applied second plurality of forces in response to at least one of a newly detected driver event or a newly detected environmental event, and disengaging at least one of the plurality of yaw control elements or the plurality of roll control elements in response to not detecting a new driver event or a new environmental event requiring stabilization about the yaw axis or about the roll axis.

16. The method of claim 13, wherein the plurality of yaw control elements are in phase with an operation of the automobile in response to the automobile operating at a first speed condition, and wherein the plurality of yaw control elements are out of phase with an operation of the automobile in response to the automobile operating at a second speed condition.

17. The method of claim 13, wherein at least one applied force of the applied second plurality of forces is a downward force applied to a first portion of the automobile.

18. An automobile having a yaw axis, the automobile comprising:
a chassis;
a plurality of wheels rotatably coupled to the chassis;
an engine mounted to the chassis and configured to engage and drive the plurality of wheels;
a body mounted on the chassis and configured to at least partially enclose the engine;
a control unit in electronic communication with the engine and configured to manage an operation of the engine;
a chassis stabilization system including a first plurality of moveable aerodynamic elements, the first plurality moveable aerodynamic elements being configured to cause a first plurality of forces to be applied to and distributed over the body of the automobile to control a yaw movement or rotation of the automobile about the yaw axis, wherein the chassis stabilization system is in electronic communication with the control unit such that the control unit moves the first plurality of moveable aerodynamic elements in response to a first driver event or a first environmental event causing a yaw displacement of the automobile about the yaw axis;
a first plurality of sensors configured to detect a feedback yaw effect of the applied first plurality of forces; and
a second plurality of sensors configured to detect a feedback environmental condition,
wherein the first plurality of moveable aerodynamic elements are configured to cause a first plurality of response forces to be applied to the automobile to control the yaw movement of the automobile about the yaw axis based on the feedback yaw effect and based on the feedback environmental condition.

19. The automobile of claim 18, further having a roll axis, the automobile further comprising a second plurality of moveable aerodynamic elements movably installed under the automobile and configured to cause a second plurality of forces to be applied to and distributed over the chassis to control a roll movement of the automobile about the roll axis, wherein the chassis stabilization system is configured to be in electronic communication with the control unit such that the control unit controls movement of the second plurality of moveable aerodynamic elements in response to a second driver event or a second environmental event causing a roll displacement of the automobile about the roll axis, the first plurality of sensors are configured to detect a feedback roll effect of the applied second plurality of forces, and the second plurality of moveable aerodynamic elements are configured to cause a second plurality of response forces to be applied to the automobile to control the roll movement of the automobile about the roll axis based on the feedback roll effect and based on the feedback environmental condition.

20. The automobile of claim 18, wherein the first plurality of moveable aerodynamic elements are a plurality of fins movably installed on the body of the automobile, the plurality of fins are configured to cause the first plurality of response forces to be applied to counteract a first overcorrection in the yaw movement of the automobile as a result of the applied first plurality of forces, and the second plurality of moveable aerodynamic elements are configured to cause the second plurality of response forces to be applied to counteract a second overcorrection in the roll movement of the automobile as a result of the applied second plurality of forces.

* * * * *